United States Patent
Ward et al.

(10) Patent No.: US 12,052,995 B2
(45) Date of Patent: Aug. 6, 2024

(54) SYSTEM FOR ROLLING FOOD PRODUCTS

(71) Applicant: Pacproinc, LLC, Souderton, PA (US)

(72) Inventors: Andrew Ward, Limerick, PA (US); Charles Faust, Bensalem, PA (US)

(73) Assignee: PACPROINC, LLC, Souderton, PA (US)

( * ) Notice: Subject to any disclaimer, the term of this patent is extended or adjusted under 35 U.S.C. 154(b) by 813 days.

(21) Appl. No.: 17/142,678

(22) Filed: Jan. 6, 2021

(65) Prior Publication Data
US 2021/0212325 A1 Jul. 15, 2021

Related U.S. Application Data

(60) Provisional application No. 62/959,540, filed on Jan. 10, 2020.

(51) Int. Cl.
*A21C 3/06* (2006.01)

(52) U.S. Cl.
CPC .............. *A21C 3/06* (2013.01); *A21C 3/065* (2013.01)

(58) Field of Classification Search
CPC ................................ A21C 3/06; A21C 3/065
See application file for complete search history.

(56) References Cited

U.S. PATENT DOCUMENTS

| | | | |
|---|---|---|---|
| 5,724,787 A | 3/1998 | Diete | |
| 5,756,138 A | 5/1998 | Milohanic | |
| 2012/0308693 A1 | 12/2012 | Van Blokland | |
| 2019/0124969 A1* | 5/2019 | Shtilerman | A23P 20/20 |
| 2019/0364910 A1 | 12/2019 | Bernhardt | |

FOREIGN PATENT DOCUMENTS

| | | | |
|---|---|---|---|
| EP | 0 213 088 A1 | 3/1987 | |
| EP | 0 230 335 A2 | 7/1987 | |
| EP | 1135985 A1 * | 9/2001 | ............... A21C 3/06 |
| EP | 2201849 A1 * | 6/2010 | ............... A21C 3/06 |
| WO | WO 97/02750 A1 | 1/1997 | |

OTHER PUBLICATIONS

International Search Report from corresponding International Application No. PCT /US2021/012299, Jul. 15, 2021, 8pp.

* cited by examiner

*Primary Examiner* — Reginald Alexander
(74) *Attorney, Agent, or Firm* — Crowell & Moring LLP

(57) ABSTRACT

A system and method for rolling planar food products that rest upon interleaving paper is provided. The system includes first and second conveyors, a rotating mechanism and a movement system. The rotating mechanism is normally disposed at a first position proximate to the end of the first conveyor such that a leading edge of planar dough that extends over the first conveyor falls with respect to the rotating mechanism. The controller urges rotation of the rotation mechanism as the leading edge extends with respect to the rotating mechanism and rotates until the planar food product is fully rolled about the rotation mechanism. The movement mechanism then translates the rotation mechanism to a position where it is aligned with the second conveyor.

14 Claims, 5 Drawing Sheets

SYSTEM FOR ROLLING FOOD PRODUCTS

CROSS-REFERENCE TO RELATED APPLICATIONS

This application claims priority to U.S. Provisional Application Ser. No. 62/959,540, filed Jan. 10, 2020, which is incorporated herein by reference in its entirety.

BACKGROUND

This disclosure relates to systems for automatically rolling dough from planar sheets to a rolled configuration, such as for packaging for shipment or storage for later use. It is known to be difficult to develop a system where planar sheets of dough that rest upon individual sheets of papers, such as interleaving paper, can be rolled in a consistent and efficient manner.

BRIEF SUMMARY

A first representative embodiment of the disclosure is provided. The embodiment includes a system for rolling planar food product for packaging. The system includes a first conveyor that extends to an end portion such that objects disposed upon the first conveyor during operation of the first conveyor are translated toward the end portion, wherein the first conveyor continuously moves at a constant speed, and a second conveyor, wherein the second conveyor is configured to periodically move a predetermined distance. A rotation member is disposed in a first position proximate to the end portion of the first conveyor and spaced away from the first conveyor, and a motor to cause rotation of the rotation member. A movement system is capable of moving the rotation member between the first position and a second position that is above the second conveyor. A first sensor is disposed with respect to the first conveyor to identify when a leading edge of an object disposed upon the first conveyor reaches a third position that is proximate to the end portion of the first conveyor and to also identify when a trailing edge of the object disposed upon the first conveyor reaches the third position. A controller is configured to normally direct the rotation member to be aligned in the first position, and to direct rotation of the rotation member after a predetermined time delay after the leading edge of the object reaches the first position proximate to the end portion of the first conveyor.

Another representative embodiment of the disclosure is provided. The embodiment includes a method of rolling planar food product for packaging as provided here. The method includes the steps of providing a first conveyor that extends to an end portion such that objects disposed upon the first conveyor during operation of the first conveyor are translated toward the end portion, wherein the first conveyor continuously moves at a constant speed, providing a second conveyor, wherein the second conveyor is configured to periodically move a predetermined distance, wherein the second conveyor is disposed at an elevation above a top surface of the first conveyor, and providing a rotation member supported by a movement system, wherein the movement system is capable of moving the rotation member between a first position and a second position that is above the second conveyor, wherein the first position is proximate to the end portion of the first conveyor and spaced away from the first conveyor. The step of providing a motor to selectively cause rotation of the rotation member and the step of providing a first sensor disposed with respect to the first conveyor to identify when a leading edge of an planar food product disposed upon the first conveyor reaches a third position that is proximate to the end portion of the first conveyor and to also identify when a trailing edge of the planar food product disposed upon the first conveyor reaches the third position are provided. The step of controlling the position of the rotation member to be normally aligned in the first position, and rotating the rotation member after a predetermined time delay after the leading edge of the object reaches the first position proximate to the end portion of the first conveyor, whereby the planar food product interacts with the rotation member and is rolled about itself and the rotation member to align in a rolled configuration.

Other systems, methods, features and advantages of the invention will be, or will become, apparent to one with skill in the art upon examination of the following figures and detailed description. It is intended that all such additional systems, methods, features, and advantages be within the scope of the invention, and be encompassed by the following claims.

DETAILED DESCRIPTION OF THE DRAWINGS AND THE PRESENTLY PREFERRED EMBODIMENTS

Figure 1:
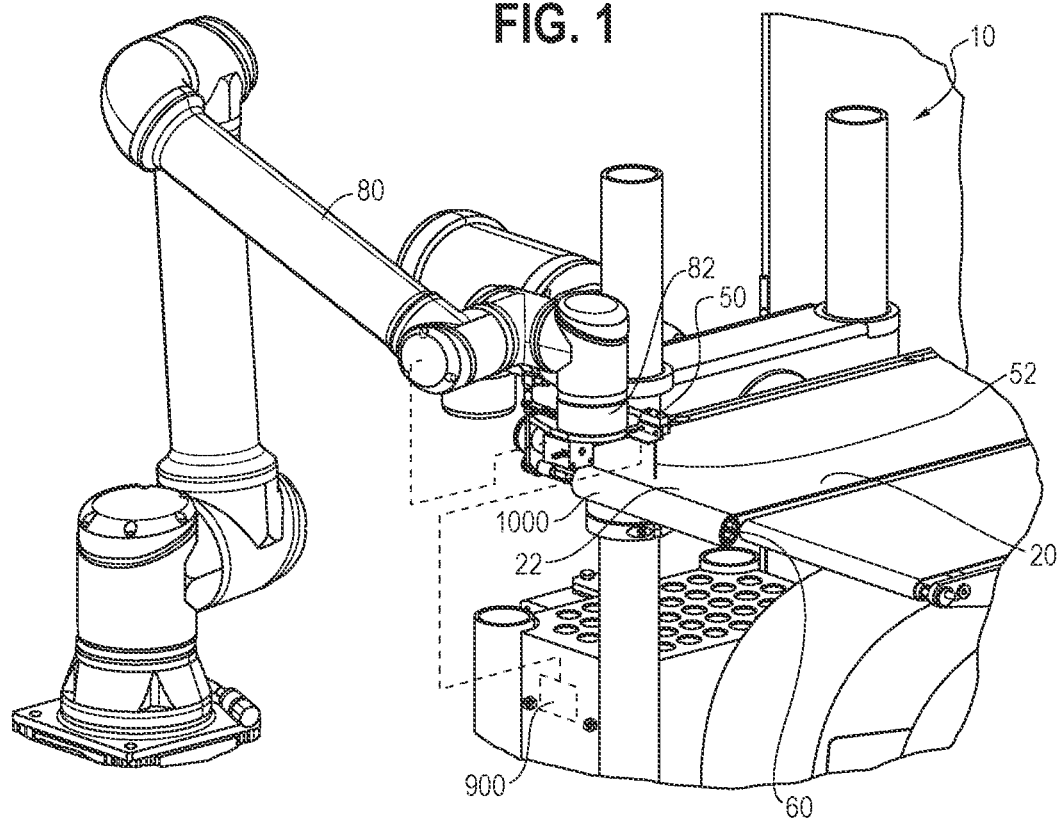
FIG. 1 is a perspective view of a portion of a system for a rolling a planar food product, depicting the movement system positioning the rotation member in a first position and partially depicting a robotic arm as the movement member.

Turning now to FIGS. 1-8, a system 10 for rolling planar food product 1000 is provided. The system 10 includes a first conveyor 20, a second conveyor 40 and a rotation member 60 that is movable between first and second positions (FIG. 1 and FIG. 4, respectively) by a movement system 80 to be selectively proximate to and aligned with the respective first and second conveyors 20, 40. Each of these components and their interrelation will be described in detail below.

Figure 3:
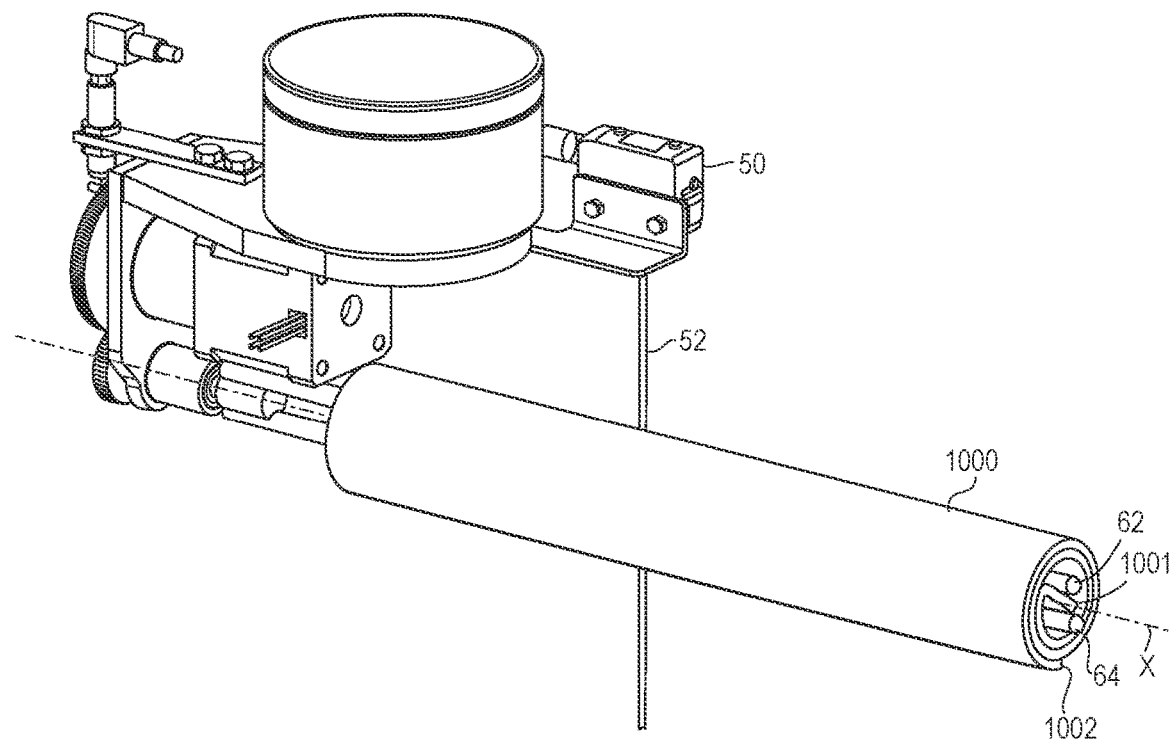
FIG. 3 is another perspective view of the rotation of member of FIG. 1 depicting the rotation member supporting a planar food product in a rolled configuration.

The system 10 is configured to receive a planar food product 1000, roll the planar food product 1000 into a rolled configuration (FIGS. 3 and 4) and deposit the rolled food product onto the second conveyor 40 where it is moved to a position where it is packed for shipment or sale to a consumer, or interacted with in another manner during a food product preparation or processing line. The planar food product 1000 may be prepared (e.g. flattened into a thin sheet) by a machine (not shown) remote from the first conveyor 20 and then deposited onto the first conveyor 20. Movement of the first conveyor 20 after receipt of the planar food product 1000 causes the food product 1000 to move toward an outlet portion 22 of the first conveyor 20. The figures depict a thin rectangular planar food product 1000, which extends from a leading portion 1001 to a trailing portion 1002. It should be understood that the planar food product may be various shapes and sizes, including rectangular, triangular, other polygon shapes, circular, elliptical, other curved shapes, an arbitrary shape, or shaped like a known object before it is rolled by the system 10. The leading portion 1001 may be the front edge of the planar food product 1000 that is furthest forward upon the first conveyor 20, and therefore is at the center of the planar food product 1000 when rolled (i.e. proximate to the central axis X of the rolled food product (FIG. 3). Alternatively, the leading portion 1001 may be a leading point, or a leading surface. Similarly, the trailing portion 1002 may be the rear edge, rear point, or rear surface of the planar food product 1000 as it is deposited upon the first conveyor 20 and will be disposed upon the outer portion of the rolled food product (FIG. 3).

In some embodiments, the planar food product 1000 deposited upon the first conveyor 20 may be resting upon a sheet of paper 1100 that is sized at about the same size (i.e. cross-sectional area of the surface that rests upon the first conveyor 20) as the planar food product 1000. In some embodiments, the paper 1100 may have a slightly larger cross-section such that a small portion of paper extends beyond the outer circumferential edges of the planar food product 1000, such as by ⅛ inch or ¼ inch. It should be understood that the term "about" is defined herein to include the exact same size as well as a size plus or minus a nominal amount, such as ⅛ inch or ¼ inch. It should be also understood that while the intention of this system (in embodiments that are configured to receive a planar food product 1000 upon the first conveyor 20 upon a sheet of paper 1100) is that the entire surface of area of the planar food product 1000 rests upon a sheet of paper 1100, it is possible and within the scope of this disclosure to have a nominal portion of the planar food product 1000 not rest upon paper 1100, often due to the tolerances of the size of the planar food product 1000 as provided to the first conveyor 20 and the tolerances of the placement of the planar food product 1000 upon the paper 1100. In some embodiments, a system (not shown) is provided to cause a planar food product 1000 to be disposed upon the sheet of paper 1100, which may occur upstream of the first conveyor 20 or upon the first conveyor 20. The paper 1100 may be various types of papers, such as interleaving paper, that is known in the art to receive a food product 1000 thereon, such as a food product of baked dough, in preparation for packaging of the food product or other uses in a food processing, food packaging, or food cooking/baking process.

The first conveyor 20 is depicted in FIGS. 1 and 5-8. The first conveyor 20 may extend horizontally, or at an upward or downward angle, either for a portion of the first conveyor 20 or the entire first conveyor 20. The first conveyor extends toward an end portion 22, which is positioned at a location where an object, such as the planar food product 1000 will fall off of the first conveyor 20 when the first conveyor 20 is moving and the planar food product 1000 reaches and extends past the end portion 22. The first conveyor 20 may be a continuous belt, a plurality of rollers, or other types of conveyors known in the art. In some embodiments, the first conveyor 20 may continuously move at a continuous speed, or in some embodiments, a portion of the first conveyor that leads to and includes the end portion 22 may move at a continuous speed. Alternatively, the first conveyor 20 may periodically operate (such as when a sensor, not shown, identifies that a planar food product has been deposited upon the first conveyor 20, or for a periodic time interval). In these embodiments, the first conveyor 20 may operate at a continuous speed when periodically operating.

Figure 4:
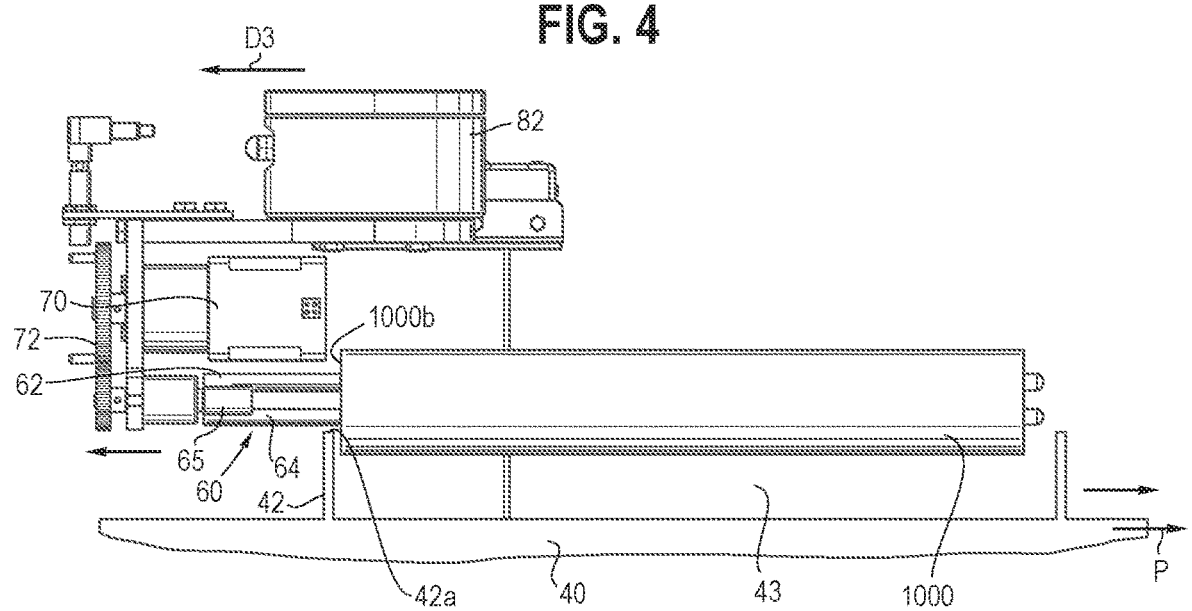
FIG. 4 is a front view of the rotation member of FIG. 1 in the second position and supporting a planar food product in a rolled configuration.
Figure 5:
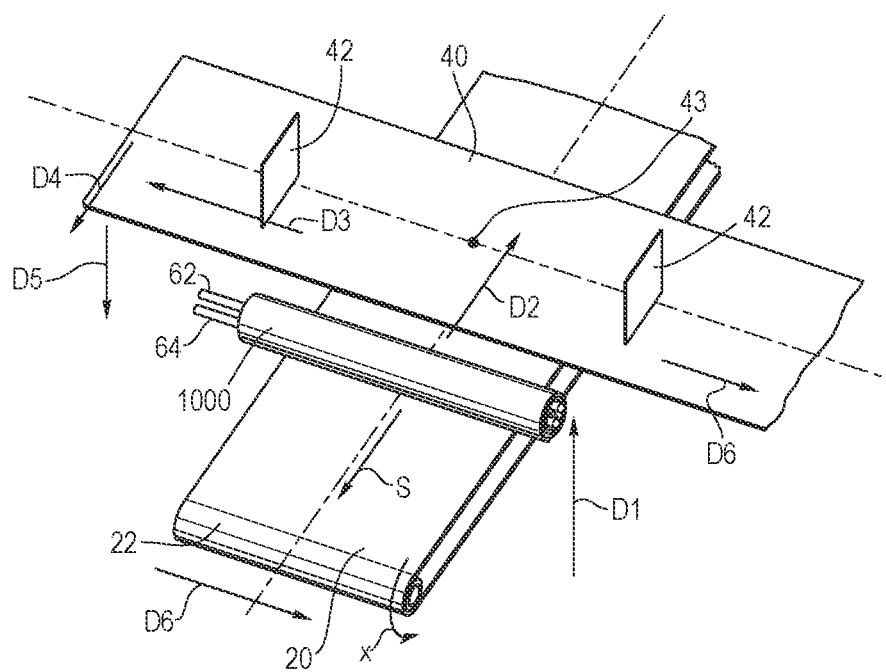
FIG. 5 is an upper perspective view of the system for rolling a planar food product depicting a first conveyor and a second conveyor, with the rotation member in an intermediate position between the first and second positions, and depicting schematically the various movements made by the rotation member as urged by the movement member.

The second conveyor 40 is depicted in FIGS. 4 and 5. The second conveyor 40 is aligned to receive a rolled food product 1000 from the rotation member in a position where the rolled food product 1000 is deposited upon the second conveyor by the movement system 80. The second conveyor 40 may include a plurality of evenly spaced flights 42 as depicted in FIGS. 4 and 5. As depicted in FIG. 4 two adjacent flights 42 are disposed with a space 43 that is somewhat larger than the nominal length of the rolled food product 1000. The second conveyor may move periodically move, as urged by a controller 900. For example, in some embodiments, the second conveyor 40 may be still and positioned such that the space 43 is disposed in a position in alignment with a second position (FIG. 4) of the movement system 80, such that a rolled food product 1000 that is removed from the rotation member 60 is deposited within the space 43. Upon receipt of a rolled food product 1000 within the space 43, the second conveyor 40 may move to translate the deposited rolled food product 1000 to a different relative position from the position in registry with the second position to allow another rolled food product 1000 to be deposited into a different space 43 (i.e. between two other flights 42 upon the second conveyor 40). In some embodiments, after the second conveyor 40 receives a rolled food product 1000 within the space 43, the second conveyor 40 moves such that the rolled product 1000 is transferred to a location for its next step, such as a packaging station. During the time that the second conveyor 40 is moving, the first conveyor 20 may be rolling another planar food product 1000 as discussed herein and the second conveyor 40 comes to rest with a space 43 positioned in registry with the second position of the movement system 80 before the rotation member 60 reaches the second position another rolled dough member 1000.

The rotation member 60 is provided. The rotation member 60 includes two tines 62, 64 that extend substantially parallel with each other and/or parallel with a space 63 therebetween. The term substantially parallel is specifically defined herein to include being exactly parallel and further including respective angles with respect to each other that are less than or equal to 2 degrees away from parallel. The two tines 62, 64 are supported by a collar 65 or other type of support member, and the two tines 62, 64 extend from the collar 65 in a cantilevered manner. The tines 62, 64 (either directly or via the collar 65 when provided) may be rotated in the direction Y (FIG. 6) via a motor 70, either directly or via a transmission 72, which will result in a rolled food product with the food product side facing out, alternatively, the tines may be rotated in the alternate direction W, which will result in the paper 1100 disposed below the planar food product 1000 (when provided) on the outside of the rolled food product. The motor 70 may be a stepper motor. The transmission may be a gear system with an input and output, or another type of known transmission 72. The controller 900 may selectively cause the motor 70 to rotate and therefore cause rotation of the two tines. The length of the tines 62, 64 should be just longer than the length of the rolled food product 1000 such that the rolled food product is fully received upon the tines.

Figure 2:
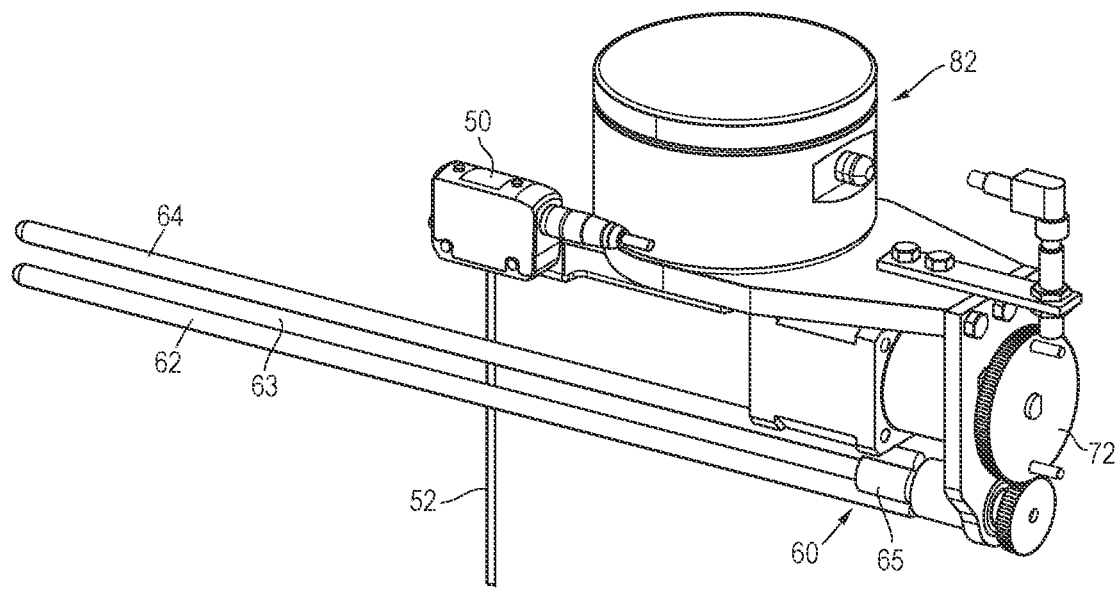
FIG. 2 is a perspective view of the rotation member of FIG. 1.

The movement system 80 is shown schematically in FIG. 1, with a portion of the movement member 82 shown in other figures. The movement system 80 supports the rotation member 60 and is capable of moving the rotation member 60 between a first position (FIG. 1) where the rotation member is proximate to and spaced away from the end portion 22 of the first conveyor and to a second position (FIG. 4) where the rotation member 60 is disposed above the second conveyor 40 and above the space 43 between two adjacent flights 42. The movement system 80 may move the rotation member 60 between the first and second positions as urged by the controller 900, as discussed herein. In some embodiments, the movement system 80 may be a robot, such as a robotic arm, or other automated movement system. Alternatively, the movement system 80 may be a linkage or a conveyor as known in the art. FIGS. 2-4 depict a component 82 of the robotic arm that supports the rotation member 60, and FIG. 1 depicts a portion of a conventional robotic arm.

One embodiment of a path of movement of the movement system 80 between the first and second positions is schematically depicted in FIG. 5. In the first position, the movement system 80 supports the rotating member 60 and specifically the first and second tines 62, 64 proximate to the end 22 of the first conveyor 20, specifically in a position where a leading portion 1001 of a planar food product 1000 that extends to the end 22 of the movement system 80 due to motion of the first conveyor 20 extends between the space 63 of the first and second tines 62, 64 as the planar food product 1000 is urged off of the first conveyor 20 due to motion of the first conveyor 20. Rotation of the rotation member 60 as urged by the controller 900 will be discussed below. As discussed below, as the rotation member 60 rotates, the food product is rolled onto the tines 62, 64 to achieve a rolled profile.

After the food product 1000 has been entirely rolled upon the tines 62, 64 the controller discontinues rotating the tines and then causes the movement system 80 to move toward the second conveyor 40 to transition the rotation member 60 to the second position. One of ordinary skill in the art with a thorough review of this specification and figures will readily understand that the motion of the movement system 80 between the first and second positions is a function of the relative positions between the first and second conveyors 20, 40, and the specific motion needed to translate the rotation member 60 between the first and second positions can be readily identified (with knowledge of the relative positioning of the first and second conveyors) with routine knowledge in the art regarding robotics (or other types of moving members) and for the sake of brevity is not discussed herein.

For the sake of completeness, this specifically generally describes the motion of the movement system 80 between the first and second positions in an embodiment where the second conveyor is disposed vertically above the first conveyor 20 and the first and second conveyors 20, 40 are disposed with axes that are perpendicular to each other. In this embodiment, after the food product 1000 has been entirely rolled upon the tines 62, 64 the movement system 80 moves the rotation member 60 away from the first position and toward the second position (FIG. 4), which is disposed vertically above the first position. Initially the movement system 80 lifts the rotating member 60 vertically (arrow D1) to a vertical position where the rotating member 60 is disposed at a higher vertical position than the top edge 42a of the flights 42 (and specifically at a height where the rolled food product 1000 is also above the top edge 42a of the flights 42). The movement system 80 then urges the rotation member 60 horizontally until the rotation member 60 is disposed above and in alignment with the space 43 between neighboring flights 42 upon the second conveyor 40 (arrow D2). Depending upon the vertical height of the rotation member 60, including the bottom of the rolled food product, the movement system 80 may lower the rotation member until a portion of the rolled food product 1000 is disposed below the top edge 42a of the flight 42 proximate to an end face or portion (i.e. when the rolled food product does not form a flat end face) 1000b of the rolled food product 1000, but the first and second tines remain above the top edge 42a, as depicted in FIG. 4.

In some embodiments, the movement system 80 may then move horizontally (arrow D3) in a direction. This motion initially causes the rolled food product 1000 to move similarly, in the direction D3 until it contacts the flight 42. With continued relative motion between the flight 42, the rolled food product 1000 is maintained stationary with respect to the flight 42 (as can be understood with reference to FIG. 4), which eventually causes the rolled food product 1000 to fall off of the tines 62, 64 and land upon the second conveyor 40. The second conveyor 40 then may move to translate the rolled food product 1000 for packaging or another operation as discussed herein.

In other embodiments, the movement system 80 may remain stationary, by the second conveyor 40 moves with respect to the rotation member 60 (and the rolled food product 1000 disposed upon the tines 62, 64) in the direction P (FIG. 4). This motion causes the flight 42 to contact the end face 1000b of the rolled food product and push the rolled food product in the right direction (direction P) as depicted in FIG. 4. Until the rolled food product 1000 falls off of the tines 62, 64 and falls into the space 43.

The movement system 80 then returns the rotation member 60 (now without the rolled food product) back to the first position, which in this embodiment includes horizontal movement (arrow D4) opposite from arrow D2, downward movement (arrow D5) opposite from D1, and rightward movement (arrow D6) opposite from D3. The movement system 80 maintains the rotation member 60 in the first position until the tines 62, 64 receive another planar food product 1000 from the first conveyor 20.

Figure 6:
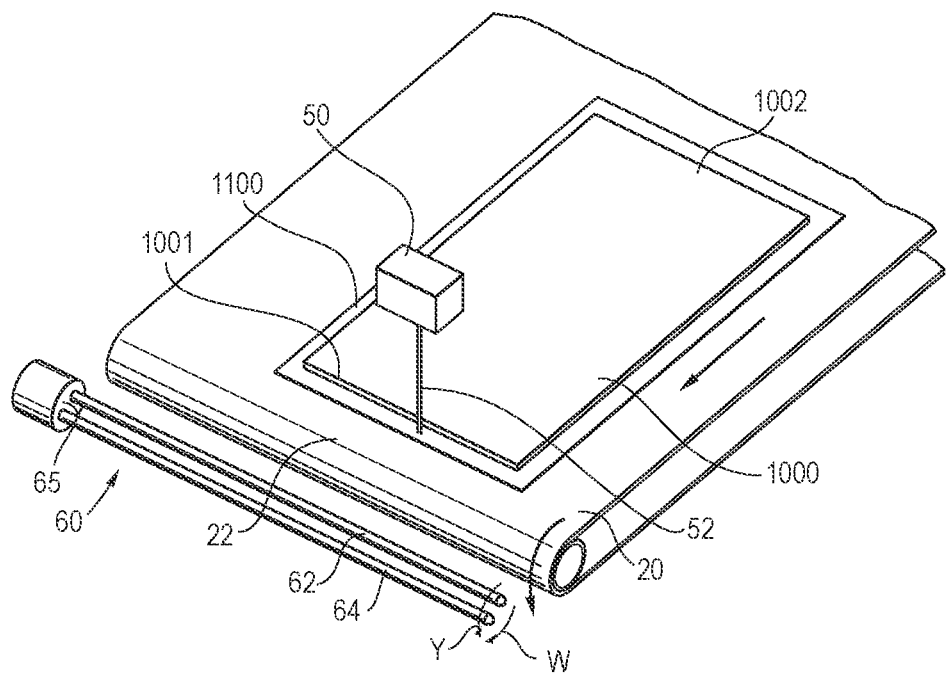
FIG. 6 is a perspective view of the conveyor of FIG. 1 supporting a planar food product, with a leading portion of the planar food product aligned in the third position with respect to a sensor.

The system 10 may include a first sensor 50, which is configured to determine when a planar food product 1000 is positioned with respect to the end 22 of the first conveyor 20. For example, as depicted in FIGS. 1 and 6, the sensor 50 is positioned proximate to the end portion 22 of the first conveyor 20, and specifically identifies when a leading portion 1001 of the planar food product 1000 reaches a predetermined distance from the end portion 22. In this embodiment, the sensor 50 is disposed to monitor for the presence of the planar food product at this position, identified as a third position for the sake of nomenclature. In these embodiments, the translation speed of the first conveyor 20 is known (and there is no slippage between the food product and the first conveyor 20, or it is so minor that it can be ignored) and therefore the time between when the sensor 50 identifies that the position of the leading portion 1001 and the time that the leading portion 1001 falls off of the end 22 of the first conveyor 20 and extends between the first and second tines 62, 64 can be calculated through experimentation, and that time delay programmed into the controller 900.

Figure 7:
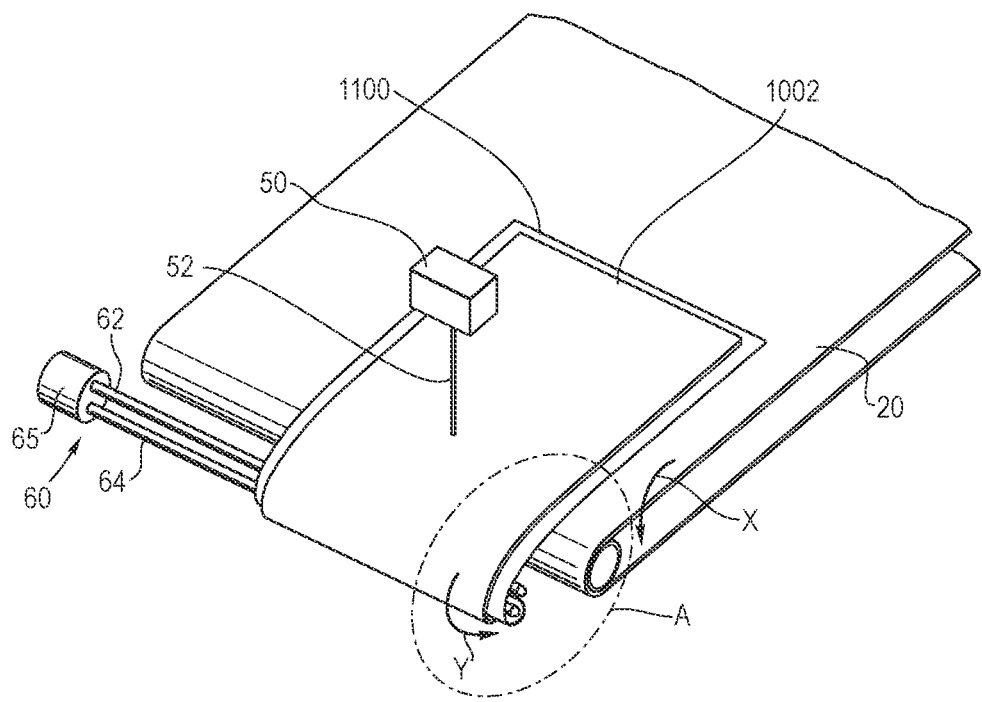
FIG. 7 a perspective view of the conveyor of FIG. 6 supporting a planar food product, with the planar food product being wrapped into a rolled configuration by the rotation member.
Figure 8:
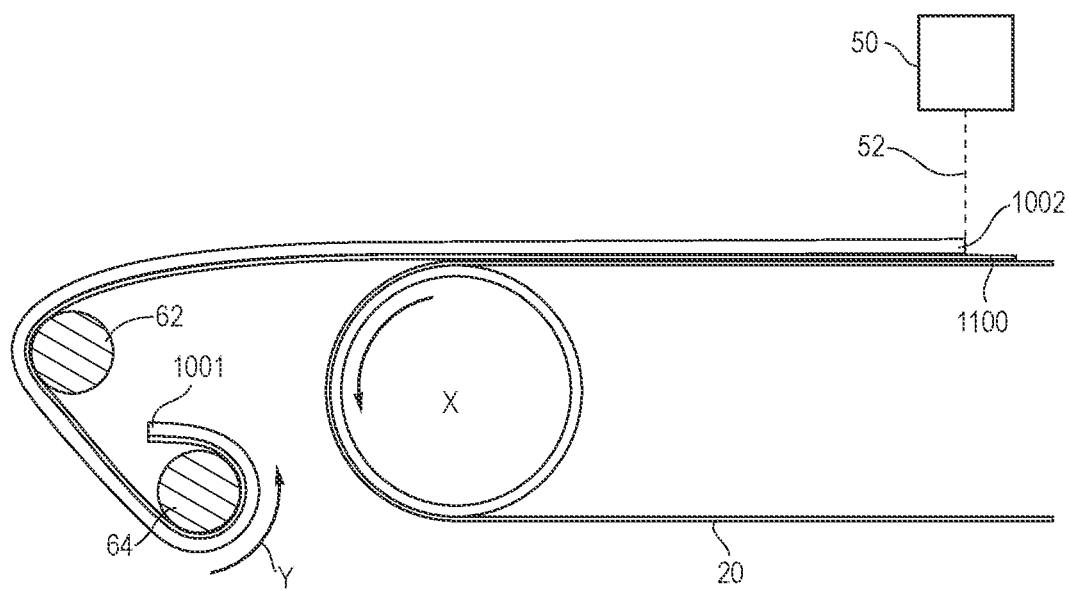
FIG. 8 is a side view of detail A of FIG. 7.

In some embodiments, after the sensor 50 initially identifies the leading portion 1001 of the planar food product 1000, the sensor 50 is configured continuously to monitor for the presence of the planar food product 1000 as it is moved along the conveyor, as shown in FIG. 7. When the sensor 50 no longer identifies the presence of the food product at the third position (i.e. the time just after the position depicted in FIG. 8 with slightly additional motion of the planar food member 1000), a signal is sent to the controller 900.

In other embodiments, where the size of the planar food product 1000 disposed upon the first conveyor 20 is consistent, the sensor 50 may identify the position of the leading portion 1001 at position three, and then cause first and second timers to start. The first timer is discussed in detail below. The second timer may be a timer that is calibrated to count a lapse of time that is equivalent to the time for the entire planar food product 1000 to pass by the third position, as understood due to the constant speed of the first conveyor 20 and the known size/length of the planar food product.

In some embodiments, the sensor 50 may be fixed in position to monitor the third position, while in other embodiments, the sensor 50 may be mounted to be relatively fixed with respect to the rotation member 60 and move with the rotation member 60 by the movement system 80 as depicted in FIGS. 1 and 4.

The sensor 50 may be an optical sensor as shown schematically in the figures to direct a laser beam 52 toward the third position upon the first conveyor 20. In other embodiments, the sensor 50 may be different type of sensor such as a light sensor or other types of known position sensors.

As discussed above, when the sensor 50 identifies that the leading portion 1001 of the planar food product 1000 has reached position 3, it starts a first timer. In embodiments where the planar 1000 food product is disposed upon a sheet of paper 1100, the sensor 50 may initially identify the presence of the leading edge of the sheet of paper at position three, if that occurs before the leading edge of the planar food product reaching position three. Throughout this specification, the system is discussed with respect to the planar food product, and one of skill in the art should readily understand that the disclosed embodiments are operable when the planar food product 1000 rests upon a sheet of paper 1100 or rests directly upon the first conveyor 20. In embodiments, where the planar food product 1000 rests upon a sheet of paper 1100, the stacked paper and food product are rolled about the tines 62, 64 by the rotation member 60, as discussed below, such that the top surface of a portion of the rolled food product contact the bottom surface of the paper in contact therewith in the rolled configuration.

Due to the known speed of the first conveyor 20 it can be experimentally determined the length of time from when the leading portion 1001 of the planar food product 1000 reaches the third position until the leading portion moves along the end portion and off of the first conveyor 20 and until the leading portion falls within the space 63 between the first and second tines 62, 64 (with the rotation system in the first position—FIG. 1). Based upon this experimentation determination, the first timer is set for this length of time. After the first timer starts, the controller 900 is programmed to cause rotation of the first and second tines 62, 64 after the first timer expires. Rotation of the first and second tines 62, 64 causes the planar food product 1000 to become rolled about the tines as they rotate, in the direction Y. Continued rotation causes the more rolling and the tines 62, 64 are continuously rolled. After further rotation, the trailing portion 1002 reaches position three, which is either directly observed by the sensor (time just after the image of FIG. 8) or based upon the expiration of the second timer. The controller then may start the first timer again (that allocates for the time for the trailing portion to fall off of the first conveyor) and discontinues rotation of the rotating member 60 after the expiration of this first timer.

In some embodiments, it may be experimentally observed that the rolling of the planar food product 1000 onto the tines may serve to pull the food product from the first conveyor 20. In these embodiments, the length of the rotation may be altered when programming the controller to ensure that the rotation member 60 no longer rotates once the planar food product 1000 is fully rolled upon the tines 62, 64.

While various embodiments of the present disclosure have been described, the present disclosure is not to be restricted except in light of the attached claims and their equivalents. One skilled in the relevant art will recognize that numerous variations and modifications may be made to the embodiments described above without departing from the scope of the present invention, as defined by the appended claims. Moreover, the advantages described herein are not necessarily the only advantages of the present disclosure and it is not necessarily expected that every embodiment of the present disclosure will achieve all of the advantages described.

We claim:

1. A system for rolling planar food product for packaging, comprising:
   a first conveyor that extends to an end portion such that objects disposed upon the first conveyor during operation of the first conveyor are translated toward the end portion, wherein the first conveyor continuously moves at a constant speed;
   a second conveyor, wherein the second conveyor is configured periodically to move a predetermined distance;
   a rotation member disposed in a first position proximate to the end portion of the first conveyor and spaced away from the first conveyor, and a motor to cause rotation of the rotation member;
   a movement system that is capable of moving the rotation member between the first position and a second position that is above the second conveyor;
   a first sensor disposed with respect to the first conveyor to identify when a leading edge of an object disposed upon the first conveyor reaches a third position that is proximate to the end portion of the first conveyor and to also identify when a trailing edge of the object disposed upon the first conveyor reaches the third position; and
   a controller that is configured to normally direct the rotation member to be aligned in the first position, and to direct rotation of the rotation member after a predetermined time delay after the leading edge of the object reaches the first position proximate to the end portion of the first conveyor;
   wherein the movement system includes a robotic arm that is configured for and capable of moving the rotation member between the first and second positions;
   wherein the second conveyor is disposed vertically above the first conveyor and the movement system is configured to move rotation member to the second position above a receiving position of the second conveyor; and
   wherein a first longitudinal axis through the end portion of the first conveyor is perpendicular to a second longitudinal axis through the receiving position of the second conveyor.

2. The system of claim 1, wherein the controller is further configured to direct rotation of the rotation member until the first sensor identifies that the trailing edge of the object disposed upon the first conveyor reaches the third position and a second instance of the predetermined time delay has lapsed.

3. The system of claim 1, wherein the controller is further configured to direct rotation of the rotation member until the first sensor identifies that the trailing edge of the object disposed upon the first conveyor reaches the third position and a second predetermined time delay has lapsed.

4. The system of claim 1, wherein the second conveyor includes a plurality of flights evenly spaced therealong, wherein the second conveyor is arranged in operation such that when the rotation member is disposed in the second position and supporting the object, a flight of the plurality of flights is disposed proximate to the object, such that movement of the second conveyor causes the object to be removed from the rotation member.

5. The system of claim 1, wherein the rotation member is configured to receive the object thereon and with rotation of the rotation member wrap the object about the rotation member.

6. The system of claim 1, wherein the system is configured to receive a sheet of food product disposed upon a sheet of paper upon the first conveyor, wherein when the leading edge of the sheet of food product and paper reach the rotation member, the rotation member begins to rotate causing the sheet of food product and paper to roll about itself upon the rotation member.

7. A system for rolling planar food product for packaging, comprising:
a first conveyor that extends to an end portion such that objects disposed upon the first conveyor during operation of the first conveyor are translated toward the end portion, wherein the first conveyor continuously moves at a constant speed;
a second conveyor, wherein the second conveyor is configured periodically to move a predetermined distance;
a rotation member disposed in a first position proximate to the end portion of the first conveyor and spaced away from the first conveyor, and a motor to cause rotation of the rotation member;
a movement system that is capable of moving the rotation member between the first position and a second position that is above the second conveyor;
a first sensor disposed with respect to the first conveyor to identify when a leading edge of an object disposed upon the first conveyor reaches a third position that is proximate to the end portion of the first conveyor and to also identify when a trailing edge of the object disposed upon the first conveyor reaches the third position; and
a controller that is configured to normally direct the rotation member to be aligned in the first position, and to direct rotation of the rotation member after a predetermined time delay after the leading edge of the object reaches the first position proximate to the end portion of the first conveyor;
wherein the movement system includes a robotic arm that is configured for and capable of moving the rotation member between the first and second positions;
wherein the rotation member comprises two parallel tines that are spaced apart from each other, when the rotation member is in the first position, the two tines are arranged such that a sheet of food product disposed upon a sheet of paper that leaves the end portion of the first conveyor is directed through the space between the two tines, and wherein the controller is configured to direct rotation of the rotation member after the predetermined time delay, wherein the predetermined time delay includes the delay time necessary for the sheet of food product and paper that leaves the end portion of the first conveyor to extend between the two parallel tines;
wherein the controller is further configured to direct rotation of the rotation member until the first sensor identifies that the trailing edge of the object disposed upon the first conveyor reaches the third position and an instance of the predetermined time delay after the trailing edge of the object has been identified by the sensor has lapsed, corresponding to the sheet of food product being conformed as a rolled food product, wherein the controller then directs the movement system to move the rotation member to the second position above the second conveyor; and
wherein with the rotation member in the second position above the second conveyor, the controller then directs the second conveyor to move the predetermined distance, causing a flight upon the second conveyor to contact an end of the rolled food product and paper and urging the rolled food product and paper to be removed from the rotation member.

8. A system for rolling planar food product for packaging, comprising:
a first conveyor that extends to an end portion such that objects disposed upon the first conveyor during operation of the first conveyor are translated toward the end portion, wherein the first conveyor continuously moves at a constant speed;
a second conveyor, wherein the second conveyor is configured periodically to move a predetermined distance;
a rotation member disposed in a first position proximate to the end portion of the first conveyor and spaced away from the first conveyor, and a motor to cause rotation of the rotation member;
a movement system that is capable of moving the rotation member between the first position and a second position that is above the second conveyor;
a first sensor disposed with respect to the first conveyor to identify when a leading edge of an object disposed upon the first conveyor reaches a third position that is proximate to the end portion of the first conveyor and to also identify when a trailing edge of the object disposed upon the first conveyor reaches the third position; and
a controller that is configured to normally direct the rotation member to be aligned in the first position, and to direct rotation of the rotation member after a predetermined time delay after the leading edge of the object reaches the first position proximate to the end portion of the first conveyor;
wherein the movement system includes a robotic arm that is configured for and capable of moving the rotation member between the first and second positions; and
wherein the robotic arm causes the rotation member initially to move parallel with a longitudinal axis of the second conveyor and in an opposite direction from a direction of motion of the second conveyor as the robotic arm moves the rotation member from the second position toward the first position.

9. The system of claim 8, wherein the rotation member is rotated by a stepper motor via a transmission.

10. A method of rolling planar food product for packaging, comprising:

provinding a first conveyor that extends to an end portion such that objects disposed upon the first conveyor during operation of the first conveyor are translated toward the end portion, wherein the first conveyor continuously moves at a constant speed;

providing a second conveyor, wherein the second conveyor is configured to periodically move a predetermined distance, wherein the second conveyor is disposed at an elevation above a top surface of the first conveyor;

providing a rotation member supported by a movement system, wherein the movement system is capable of moving the rotation member between a first position and a second position that is above the second conveyor, wherein the first position is proximate to the end portion of the first conveyor and spaced away from the first conveyor, providing a motor selectively to cause rotation of the rotation member;

providing a first sensor disposed with respect to the first conveyor to identify when a leading edge of a sheet of a planar food product disposed upon the first conveyor reaches a third position that is proximate to the end portion of the first conveyor and to also identify when a trailing edge of the planar food product disposed upon the first conveyor reaches the third position; and controlling the position of the rotation member to be normally aligned in the first position, and rotating the rotation member after a predetermined time delay after the leading edge of the object reaches the first position proximate to the end portion of the first conveyor, whereby the planar food product interacts with the rotation member and is rolled about itself and the rotation member to align in a rolled configuration;

further comprising causing rotation of the rotation member until the first sensor identifies that the trailing edge of the planar food product disposed upon the first conveyor reaches the third position and a second instance of the predetermined time delay has lapsed;

wherein a first longitudinal axis through the end portion of the first conveyor is perpendicular to a second longitudinal axis through a receiving position of the second conveyor, and the second conveyor includes a plurality of flights evenly spaced therealong, wherein the second conveyor is arranged in operation such that when the rotation member is disposed in the second position and supporting the planar food product in the rolled configuration, a flight of the plurality of flights is disposed proximate to the planar food product in the rolled configuration, such that movement of the second conveyor causes the planar food product in the rolled configuration to be removed from the rotation member and disposed onto the second conveyor.

11. The method of claim 10, the first conveyor is configured to receive the planar food product disposed upon a sheet of paper, wherein when the leading edge of the sheet of food product and paper reach the rotation member, the rotation member begins to rotate causing the sheet of food product and paper to roll about itself upon the rotation member.

12. The method of claim 10, wherein the rotation member comprises two parallel tines that are spaced apart from each other, when the rotation member is in the first position, the two tines are arranged such that the planar food product that leaves the end portion of the first conveyor is directed through the space between the two tines, and wherein the controller is configured to direct rotation of the rotation member after the predetermined time delay, wherein the predetermined time delay includes the delay time necessary for the sheet of food product and paper that leaves the end portion of the first conveyor to extend between the two parallel tines.

13. A method of rolling planar food product for packaging, comprising:

providing a first conveyor that extends to an end portion such that objects disposed upon the first conveyor during operation of the first conveyor are translated toward the end portion, wherein the first conveyor continuously moves at a constant speed;

providing a second conveyor, wherein the second conveyor is configured to periodically move a predetermined distance, wherein the second conveyor is disposed at an elevation above a top surface of the first conveyor;

providing a rotation member supported by a movement system, wherein the movement system is capable of moving the rotation member between a first position and a second position that is above the second conveyor, wherein the first position is proximate to the end portion of the first conveyor and spaced away from the first conveyor, providing a motor selectively to cause rotation of the rotation member;

providing a first sensor disposed with respect to the first conveyor to identify when a leading edge of a planar food product disposed upon the first conveyor reaches a third position that is proximate to the end portion of the first conveyor and to also identify when a trailing edge of the planar food product disposed upon the first conveyor reaches the third position; and controlling the position of the rotation member to be normally aligned in the first position, and rotating the rotation member after a predetermined time delay after the leading edge of the object reaches the first position proximate to the end portion of the first conveyor, whereby the planar food product interacts with the rotation member and is rolled about itself and about the rotation member to align in a rolled configuration; and wherein the movement system is a robotic arm that is capable of moving the rotation member between the first and second positions, wherein—during operation—the robotic arm causes the rotation member to initially move parallel with a longitudinal axis of the second conveyor and in an opposite direction from a direction of motion of the second conveyor as the robotic arm moves the rotation member from the second position toward the first position.

14. The method of claim 13, wherein the rotating of the rotation member is performed via a stepper motor via a transmission.

* * * * *